United States Patent
Crapo et al.

(10) Patent No.: US 10,984,195 B2
(45) Date of Patent: Apr. 20, 2021

(54) METHODS AND SYSTEMS FOR USING IMPLIED PROPERTIES TO MAKE A CONTROLLED-ENGLISH MODELLING LANGUAGE MORE NATURAL

(71) Applicant: General Electric Company, Schenectady, NY (US)

(72) Inventors: Andrew Walter Crapo, Niskayuna, NY (US); Daniel Edward Russell, Walker, MI (US)

(73) Assignee: General Electric Company, Schenectady, NY (US)

( * ) Notice: Subject to any disclaimer, the term of this patent is extended or adjusted under 35 U.S.C. 154(b) by 77 days.

(21) Appl. No.: 15/631,902

(22) Filed: Jun. 23, 2017

(65) Prior Publication Data

US 2018/0373698 A1    Dec. 27, 2018

(51) Int. Cl.
*G06F 40/30* (2020.01)
*G06F 40/169* (2020.01)
(Continued)

(52) U.S. Cl.
CPC ............ *G06F 40/30* (2020.01); *G06F 40/169* (2020.01); *G06F 40/211* (2020.01); *G06F 40/226* (2020.01); *G06F 40/253* (2020.01)

(58) Field of Classification Search
CPC .......... G06F 17/30566; G06F 17/3043; G06F 17/30545; G06F 17/30418; G06F 17/30421; G06F 17/30513; G06F 17/241; G06F 17/271; G06F 17/274; G06F 17/2785; G06F 40/30; G06F 40/211; G06F 40/284;
(Continued)

(56) References Cited

U.S. PATENT DOCUMENTS 6,212,677 B1    4/2001 Ohkubo et al.
6,453,465 B1    9/2002 Klein
(Continued)

FOREIGN PATENT DOCUMENTS

WO        9809228 A1    3/1998

OTHER PUBLICATIONS

Schwitter, Rolf "Controlled natural languages for knowledge representation", Coling 2010: Poster Volume, Beijing, China, Aug. 2010, (pp. 1113-1121, 9 total pages).
(Continued)

*Primary Examiner* — Abdelali Serrou
(74) *Attorney, Agent, or Firm* — Wood IP LLC (57) ABSTRACT

A system, computer-readable medium, and a method including accessing a semantic model, the semantic model having a grammar syntax supporting a comparison of at least one of a semantic model class and an instance of a semantic model class to an incompatible value; specifying an implied property for at least one of a semantic model class and an instance of a semantic model class in the semantic model, the implied property having an associated range; adding the implied property to the semantic model, the implied property to be referenced in a validation and translation of an expression including at least one of the class and the instance of a class having the implied property specified therewith compared to an incompatible value; and generating a record of the semantic model including the implied property added thereto.

18 Claims, 5 Drawing Sheets

(51) Int. Cl.
*G06F 40/211* (2020.01)
*G06F 40/226* (2020.01)
*G06F 40/253* (2020.01)

(58) Field of Classification Search
CPC .... G06F 16/36; G06F 16/90332; G06F 40/35; G06F 30/00; G06F 30/20; G06F 40/253; G06F 16/283; G06F 40/169; G06F 40/226; G06F 16/2428; G06F 16/248; G06F 40/216; G06F 16/24539; G06F 16/334; G06F 16/8358; G06F 17/2725; G06F 17/30398; G06F 17/30554; G06F 17/30592; G06F 40/174; G06F 40/295; G06F 8/20
See application file for complete search history.

(56) References Cited

U.S. PATENT DOCUMENTS

| | | | |
|---|---|---|---|
| 7,085,708 | B2 | 8/2006 | Manson |
| 8,204,895 | B2* | 6/2012 | Polo-Malouvier .... G06F 16/283 707/758 |
| 8,930,180 | B1 | 1/2015 | Murray et al. |
| 2006/0036592 | A1* | 2/2006 | Das .................... G06F 17/30418 |
| 2006/0066632 | A1* | 3/2006 | Wong ...................... G06T 11/60 345/619 |
| 2006/0161544 | A1* | 7/2006 | Lee .................... G06F 17/3043 |
| 2008/0021700 | A1* | 1/2008 | Moitra .................. G06F 16/367 704/9 |
| 2008/0082494 | A1* | 4/2008 | Polo-Malouvier .... G06F 16/283 |
| 2010/0131874 | A1* | 5/2010 | Linthicum ............. G16H 15/00 715/764 |
| 2010/0131883 | A1* | 5/2010 | Linthicum ............. G06F 19/00 715/771 |
| 2011/0093469 | A1* | 4/2011 | B'Far ..................... G06N 5/022 707/741 |
| 2012/0278788 | A1* | 11/2012 | Crapo ....................... G06F 8/51 717/106 |
| 2013/0144828 | A1 | 6/2013 | Lawley |
| 2013/0167191 | A1* | 6/2013 | Barnett ................. G06F 21/604 726/1 |
| 2013/0275448 | A1* | 10/2013 | Mirhaji ............. G06F 17/30312 707/756 |
| 2013/0311487 | A1* | 11/2013 | Moore ................ G06F 17/2785 707/749 |
| 2014/0144828 | A1 | 5/2014 | Chiu |
| 2014/0258002 | A1* | 9/2014 | Zimmerman ...... G06Q 30/0256 705/14.72 |
| 2014/0278985 | A1* | 9/2014 | Ramakrishnan ... G06Q 30/0256 705/14.54 |
| 2014/0324908 | A1* | 10/2014 | Graham ................ G06F 16/215 707/776 |
| 2015/0032443 | A1* | 1/2015 | Karov .................... G06F 16/36 704/9 |
| 2015/0161180 | A1* | 6/2015 | Hermanns ............. G06F 16/212 707/810 |
| 2016/0019192 | A1* | 1/2016 | Crapo .................. G06F 17/2785 715/234 |
| 2016/0110478 | A1* | 4/2016 | Aggour ............. G06F 17/30994 707/755 |
| 2016/0139004 | A1* | 5/2016 | Witte .................. G01M 99/008 702/183 |
| 2016/0170714 | A1 | 6/2016 | Siu et al. |
| 2016/0179787 | A1 | 6/2016 | Deleeuw |
| 2016/0179945 | A1* | 6/2016 | Lastra Diaz .......... G06F 16/367 707/739 |
| 2017/0060868 | A1* | 3/2017 | Rais Ghasem ... G06F 16/24522 |
| 2017/0060972 | A1* | 3/2017 | McHugh ........... G06F 17/30569 |

OTHER PUBLICATIONS

Xue, Ping et al. "Information Extraction Using Controlled English to Support Knowledge-Sharing and Decision-Making", Jun. 2012, 17th ICCRTS Operationalizing C2 Agility, 35pgs.

"Implied Properties," Retrieved from the Internet URL: http://sadl.sourceforge.net/sadl3/ImpliedProperties.html, pp. 1-6 (Jun. 29, 2017).

Crapo, A. W., "SADL Architecture," Retrieved from the Internet URL: http://sadl.sourceforge.net/Architecture.html, (Oct. 23, 2014).

Crapo, A. W., "Semantic Application Design Language (SADL) (Version 2): A Detailed Look," Retrieved from the Internet URL: http://sadl.sourceforge.net/sadl2.html, pp. 1-15 (Sep. 6, 2011).

Crapo, A. W., "Semantic Modeling," Retrieved from the Internet URL: http://sadl.sourceforge.net/tutorial/foundationalconcepts.html, pp. 1-6 (Dec. 11, 2010).

Extended European Search Report and Opinion issued in connection with corresponding EP Application No. 18178259.0 dated Oct. 23, 2018.

Anonymous: "Implied Properties", Jun. 29, 2017 (Jun. 29, 2017), XP055514761, Retrieved from the Internet: URL:http://sadl.sourceforge.net/sadl3/ImpliedProperties.html, (retrieved on Oct. 12, 2018), (pp. 1-6, 6 total pages).

Crapo, A. W. "SADL Architecture", Oct. 23, 2014 (Oct. 23, 2014), XP055514907, Retrieved from the Internet: URL: http://sadl.sourceforge.net/Architecture.html, (retrieved on Oct. 12, 2018), 1pg.

Crapo, A. W. "Semantic Application Design Language (SADL), (Version 2): A Detailed Look", Sep. 6, 2011 (Sep. 6, 2011), XP055514870, Retrieved from the Internet: URL:http://sadl.sourceforge.net/sadl2.html, (retrieved on Oct. 12, 2018), (pp. 1-15, 15 total pages).

Crapo, A. W. "Semantic Modeling Using SADL", Dec. 11, 2010 (Dec. 11, 2020), XP055514786, Retrieved from the Internet: URL:http://sadl.sourceforge.net/tutorial/foundationalconcepts.html, (retrieved on Oct. 12, 2018), (pp. 1-15, 15 total pages).

Communication: "The Extended European Search Report", European Patent Office, dated Oct. 23, 2018 (Oct. 23, 2018), for European Application No. 18178259.0-1231, 11pgs.

\* cited by examiner

METHODS AND SYSTEMS FOR USING IMPLIED PROPERTIES TO MAKE A CONTROLLED-ENGLISH MODELLING LANGUAGE MORE NATURAL

BACKGROUND

The field of the present disclosure relates generally to semantic models, more particularly, to systems, devices and methods of enhancing a semantic modeling language to accommodate more natural expressions.

Semantic models formally capture knowledge regarding a domain (e.g., the English language) through defining classes, properties, instances, axioms, and rules. However, in natural language usage it is often the case that some properties of English might be omitted from sentences and/or statements. That is, natural usage of the language might be less formal and explicit than a semantic model representing the language. Requiring complete specification of properties and property chains, as specified in a semantic model, might make natural language seem constrained, rigid, and/or overly formal.

In some respects, a need exists for methods and systems that improve and enhance a semantic modeling language such that the modeling language can be used to efficiently generate natural expressions.

BRIEF DESCRIPTION

In one aspect, an embodiment of the present disclosure relates to accessing a semantic model, the semantic model having a grammar syntax supporting a comparison of at least one of a semantic model class and an instance of a semantic model class to an incompatible value; specifying an implied property for one of a semantic model class and an instance of a semantic model class in the semantic model, the implied property having an associated range; adding the implied property to the semantic model, the implied property to be referenced in a validation and translation of an expression including one of the class and the instance of a class having the implied property specified therewith compared to an incompatible value; and generating a record of the semantic model including the implied property added thereto.

In other embodiments, a system may implement, execute, or embody at least some of the features of the processes herein. In yet another example embodiment, a tangible medium may embody executable instructions that can be executed by a processor-enabled device or system to implement at least some aspects of the processes of the present disclosure.

DRAWINGS

These and other features, aspects, and advantages of the present disclosure will become better understood when the following detailed description is read with reference to the accompanying drawings in which like characters represent like parts throughout the drawings, wherein.

Unless otherwise indicated, the drawings provided herein are meant to illustrate features of embodiments of this disclosure. These features are believed to be applicable in a wide variety of systems comprising one or more embodiments of this disclosure. As such, the drawings are not meant to include all conventional features known by those of ordinary skill in the art to be required for the practice of the embodiments disclosed herein.

DETAILED DESCRIPTION

In the following specification and the claims, a number of terms are referenced that have the following meanings.

The singular forms "a", "an", and "the" include plural references unless the context clearly dictates otherwise.

"Optional" or "optionally" means that the subsequently described event or circumstance may or may not occur, and that the description includes instances where the event occurs and instances where it does not.

Figure 1:
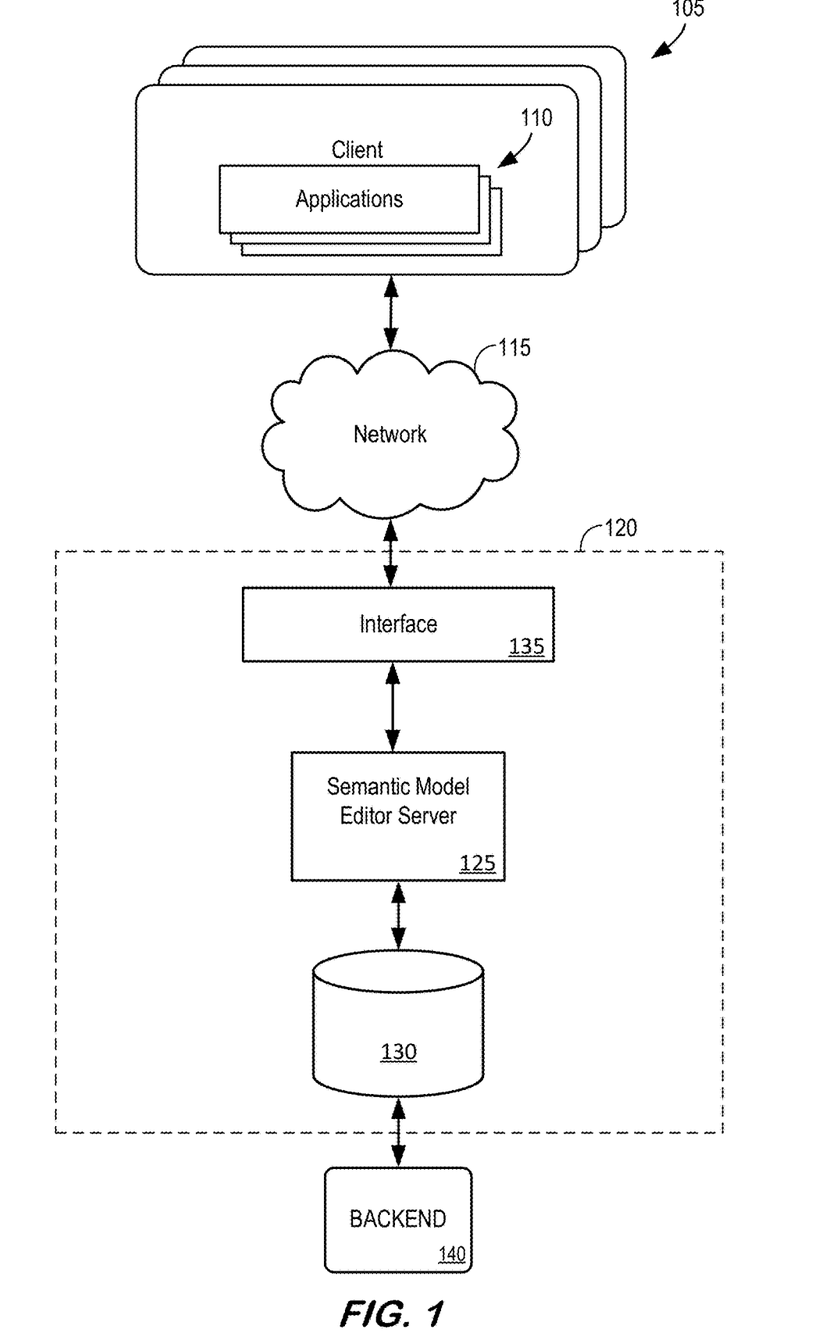
FIG. 1 is an example block diagram of a system.

FIG. 1 is an illustrative block diagram of an architecture or system 100, in one example. Examples of some embodiments of the present disclosure are not limited to the particular architecture 100 shown in FIG. 1. System 100 includes one or more client devices 105 running one or more applications 110. Applications 110 may include different software applications that support the operations and process of an organization. In some embodiments, one of the applications 110 may include, at least in part, functionality or a tool to assist a user in building a controlled-English semantic modeling language that includes features that facilitate natural expressions and using the modeling language readable by both human users and machine entities. As used herein, such features can include "implied properties". Herein, as will be explained in greater detail below, implied properties can relate to a semantic model class or an instance of a semantic model class and further define the class or instance of class to which they are associated. In some aspects, implied properties are specified as being associated with a class or an instance of a class in the semantic model. Yet, implied properties need not be specifically stated or otherwise explicitly included in a natural language expression otherwise conforming with the semantic model.

In some aspects, a controlled-language modeling language herein might be related to English. Moreover, the controlled-English is controlled in the sense that no ambiguities exist in using the controlled-English, valid statements must match a defined syntax, and match a certain semantics. However, the present disclosure is not limited to providing features and mechanisms for English-based modeling languages. In some embodiments, applications 110 may be configured to facilitate, support, and execute a program (e.g., a modeler) to generate and add implied properties to a semantic modeling language ontology and the use of such modeling language to, for example, accurately translate and evaluate natural language expressions into a semantic modeling language representation.

The cloud platform 120 may include an interface gateway 135 to facilitate, enable, and support communication between clients 105 and a semantic model editor server 125. The devices at 105 may execute a browser that is used by a user to interface with cloud platform 120 via network 115.

Semantic model editor server 125 may be associated with storage device 130 such as, but not limited to, a storage area network. In some embodiments, cloud platform 120 may include more than one instance of a server such as semantic model editor server 125 and more than one data storage device 130. Storage device 130 may comprise any query-responsive data source or sources that are or become known, including but not limited to a relational database management system. Data stored in the storage device 130 may be stored as part of a relational database, a multi-dimensional database, an Extensible Markup Language (XML) document, or any other data storage system storing structured and/or unstructured data. The data may be distributed among several relational databases, multi-dimensional databases, and/or other data sources. In some embodiments, storage device 130 may be implemented as an "in-memory" database, in which volatile (e.g., non-disk-based) storage (e.g., Random Access Memory) is used both for cache memory and for storing the full database during operation, and persistent storage (e.g., one or more fixed disks) is used for offline persistency and maintenance of database snapshots. Embodiments are not limited to any number or types of data sources. Translation server 125 may comprise a computing device that processes requests using a computer processor.

System 100 may further include a backend system that can generate, automatically, in response to a request or call from cloud platform 120, executable code or instructions to perform a process to build a semantic modeling language ontology and and/or semantic models. In some aspects herein, a user may provide an indication or request to build or add features to a semantic modeling language, as implemented in an application 110 and/or cloud platform 120 via network 115, which may operate in cooperation with the processing of a backend system 120 to generate a response to effectuate the addition of features to the semantic modelling language.

In one example, a client 105 executes an application 110 to build or add features to a semantic modeling language ontology via a user interface (UI) to a user on a display of client 105. The user may manipulate UI elements within the UI, via touchscreen, keyboard, or audio entries, to indicate and specify an implied property to associate with a class or an instance of a class of a semantic modeling language, where the cloud platform 120, in cooperation with server database 130 and possibly backend system 140, generate and add, for example, an implied property to the semantic modeling language.

In some contexts, the use of natural language may be characterized, at least in part, by the use of the name of a class to represent an instance of the class of a semantic model formal representation of the natural language. In some instances, a preceding article in a natural language statement or expression indicates whether a specific instance or any instance of the named class is being referenced. As an example, consider the sentence, "George is playing under the tree." In this example, the phrase "the tree" indicates a particular instance of the "tree" class is being referenced in the statement. The intended instance is presumably clear from context. In contrast, consider the sentence "Plan for the future—plant a tree." In this example, the term "tree" is understood to refer to some unidentified member of the "tree" class.

As an extension of this kind of construct regarding the use of a name of a class to represent an instance of the class of a semantic model's formal representation of natural language, class names may be used as proxies for a particular value of an instance of the class. This might be the case when the existence of a class in the formal semantic model is required in order to give additional information about a data value. For example, in OWL a data value does not have identity and as such it cannot be the subject of a triple (statement). Accordingly, an instance of a class is created to allow the additional information to be associated with the data value. By way of an example, measurements might have an associated numeric value as well as an associated unit.

As an example, following below is a portion of a simple ontology capturing a conceptualization of "Measurement". The ontology is expressed in the Semantic Application Design Language (SADL), a controlled-English representation whose grammars and dictionaries have been restricted in order to reduce or eliminate ambiguity and complexity and seeks to make semantic models more easily understood and authored by subject matter experts.

MeasurementSystem is a class, must be one of {SystemInternationale (alias "SI"), ImperialUnits, US_CustomaryUnits}.

Unit is a class, described by system with values of type MeasurementSystem.

Measurement is a class described by ^value with a single value of type double,
described by unit with a single value of type Unit,
described by timeStamp with a single value of type dateTime.

LengthUnit is a type of Unit, must be one of {Foot (alias "ft", "feet"), Meter (alias "m"), Centimeter (alias "cm"), Millimeter (alias "mm")}.

Using the above semantic model and given the task of measuring a football field, one might say (using natural language), "The measurement is 300". Someone might respond to this statement by saying, "Oh, then the measurement is in feet." However, to be fully consistent with the semantic model, the original statement should have been more explicit and configured as a first statement of, "The value of the instance of measurement is 300" and a second statement of "The unit of the instance of measurement is foot".

One issue or problem with the more explicit statements that are fully compliant with the semantic model is that while they are clear in their meaning due to the specificity therein, the two statements are more verbose than the original, natural language statement. In some aspects herein, the present disclosure provides a technical solution to this type of problem (for example) by disclosing implied properties that can be added to a semantic model and further used to allow a semantic model builder (or other entity) to generate an expression and statement using a class name or an instance of a class name rather than having to express statements in a complete and explicit model-consistent manner. In some aspects, the implied properties disclosed herein may provide and/or facilitate a modeling language that may be used to represent expressions more naturally, which is an objective of SADL and some other modeling languages. In some aspects, users of semantic modeling languages have demonstrated a desire for mechanisms to represent expressions in a natural language-like manner.

In some aspects, SADL grammar supports a syntax of comparing a class or instance of a class to a value, including a scenario where the value is a number or a string. However, type checking by a validation function will identify such a comparison where the two sides of the comparison are not the same type as an error. Moreover, even if the validation did not flag the comparison, then a translator function will generate output that cannot be processed or is unexpected.

As such, in some embodiments both a validator and a translator should be informed or otherwise made aware of any special handling of the class or the instance of a class comparison with the value, as effectuated by implied properties herein.

In some embodiments, a validator, a translator, and other devices/entities/functionalities might be informed of an implied property associated with a class or the instance of a class being compared (in one example) with a value by associating or designating "implied properties" on a class. An indication of an implied property on a class might be implemented, in some embodiments, as a data field, a value, a "flag", a hash value, or other mechanism/indicator in a data structure representation of the class. In some embodiments, an implied property associated with a class might be configured as an annotation property. An annotation property may be used for at least two reasons. First, OWL DL (a maximally expressive flavor of OWL) does not allow statements with user-defined OWL object properties to have classes as subjects or properties as values. Secondly, it is desired that semantic statement reasoners do not try to use the statements made about implied properties since they are only to be used by validator and translator processes. Since annotation properties are normal)/ignored by reasoners, configuring implied properties disclosed herein as an annotation property provides a technical solution to the problems being addressed.

In some embodiments, an implied property can be added to a semantic model. Continuing with the semantic model example introduced above, implied properties can be added as indicated below.

impliedProperty is a type of annotation.
Measurement has impliedProperty ^value.
Measurement has impliedProperty unit.

In the additional specification of implied properties for the "Measurement" class as indicated in the listing above, it is noted that the definition of "impliedProperty" is shown here. However, such a definition would not typically be listed as part of a user model (although it might be part of the SADL pre-defined, implicitly included concepts in, for example, SadlImplicitModel.sadl.)

In some embodiments and use-cases, when a validator or translator encounters an apparent type conflict (e.g., comparing an instance of "Measurement" to an incompatible value such as a number from the example introduced above), it can determine whether implied properties are associated with the class specified or the class to which a specified instance belongs. In the event that there is an implied property whose range is compatible with the value in the comparison, then the validator or translator will insert the implied property value in the comparison to create a "property of" construct (e.g., "value of Measurement", "unit of Measurement".

In some embodiments when implied properties are used on one side of a relationship to extend the property chain to match the type of the value on the other side, a class cannot have more than one implied property with a given range or else ambiguity results. In some instances, specifying two implied properties having ranges that are close to each other (e.g., decimal and float) may be unreliable in practice as the values for the implied properties should be carefully specified to ensure that the specified values are matched with the proper desired property since the values close in ranges might be compatible with the other property.

Figure 2:
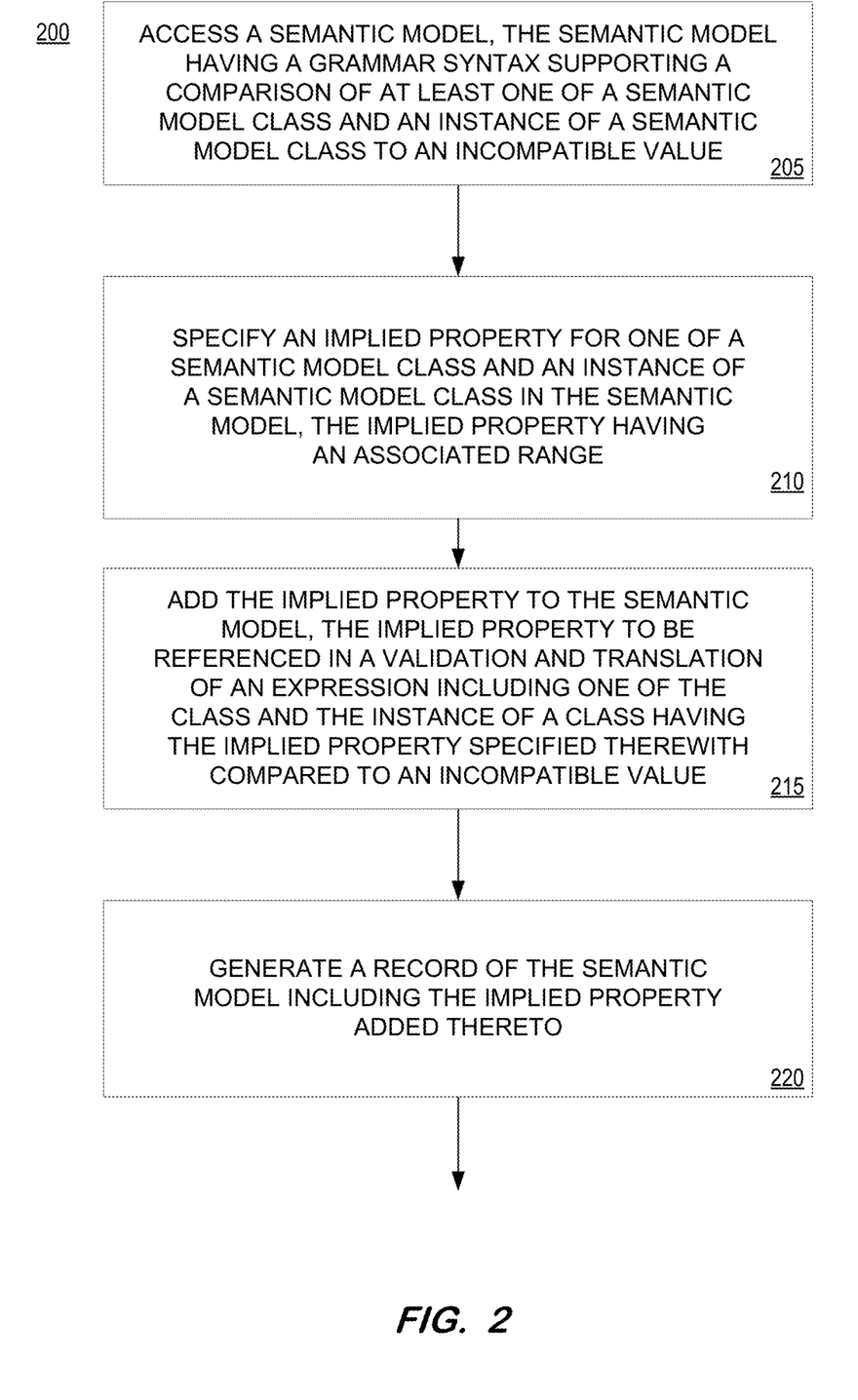
FIG. 2 is an illustrative example of a process, according to some aspects herein.

FIG. 2 is an illustrative depiction of a framework or process 200 for adding an implied property feature to a semantic modeling language ontology. In the present disclosure, the implied property might be used to translate and/or evaluate natural language expressions in the context of a controlled-English semantic model. In some embodiments, Semantic Application Design Language (SADL) Requirements Language (SRL) statement(s) might be generated to represent the natural language requirement. SADL is a controlled-English language and development environment that can be used to generate a W3C (World Wide Web Consortium) recommended OWL (Web Ontology Language) ontology. However, the ontology could be generated by other means and need not be limited to OWL, which is just one of multiple languages that could be used for the ontology. Likewise, while some of the embodiments and examples herein may be discussed in the context of using SRL, other languages with defined grammars and semantics could also be used and are within the scope of the present disclosure. In some aspects, a system ontology (e.g., SADL) is provided to, obtained by, or otherwise accessible or known by a system or device executing process 200 prior to or during the execution of process 200

At operation 205, a semantic model is accessed. The semantic model of operation 205 may include a grammar syntax that supports a comparison of at least one of a semantic model class and an instance of a semantic model class to an incompatible value. While the syntax will support the configuration of such a comparison, a validator function and/or a translator function of a semantic model processing method or system might yield an error as discussed above. In some embodiments, the incompatible value may be a number or a string value.

In accordance with some aspects herein and in an effort to facilitate and support natural language-like expressions, an implied property is specified at operation 210 of process 200. The implied property is specified or otherwise defined as being associated with a specific class or the instance of a class within the domain of the semantic model accessed in operation 205.

Proceeding to operation 215, the implied property specified (i.e., defined) at operation 210 is added to the semantic model. The implied property may be added to the semantic model via a semantic model editor (e.g., FIG. 1, system 100) or other systems, devices, and processes. Regarding the implied property added to the semantic model, the implied property added may be referenced in a validation and translation of an expression including one of the class and the instance of a class specified as being associated with the implied property at operation 210 for the purpose of (at least) being compared to an incompatible value in the expression.

In some embodiments, the fact that a class or an instance of a class is specified as being associated with an implied property does not necessarily (automatically) invoke a referencing to the implied property associated with the class and the instance of a class. Moreover, the consideration of an implied property need not be undertaken unless there is an indication of some sort that a class and an instance of a class actually has an associated implied property. Based on these factors, a processing of semantic modeling language represented statements might be efficiently and accurately processed.

At operation 220, a record of the semantic model, as modified to include the implied property as added at operation 215, is generated. The record may be implemented in any data structure now known or that becomes known in the future. The record of the semantic model including the implied property may be stored in a database and managed thereby for fast and efficient storing, retrieving, and version tracking.

In some embodiments, a semantic model improved or enhanced by the addition of an implied property as disclosed herein may be further used in other processes. In particular, such a semantic model may be used to express statements in a manner that more closely tracks natural language due, at least in part, to the implied properties included in the semantic model. This aspect of the present disclosure is indicated in FIG. 2 by the arrow pointing away from operation 220.

Figure 3:
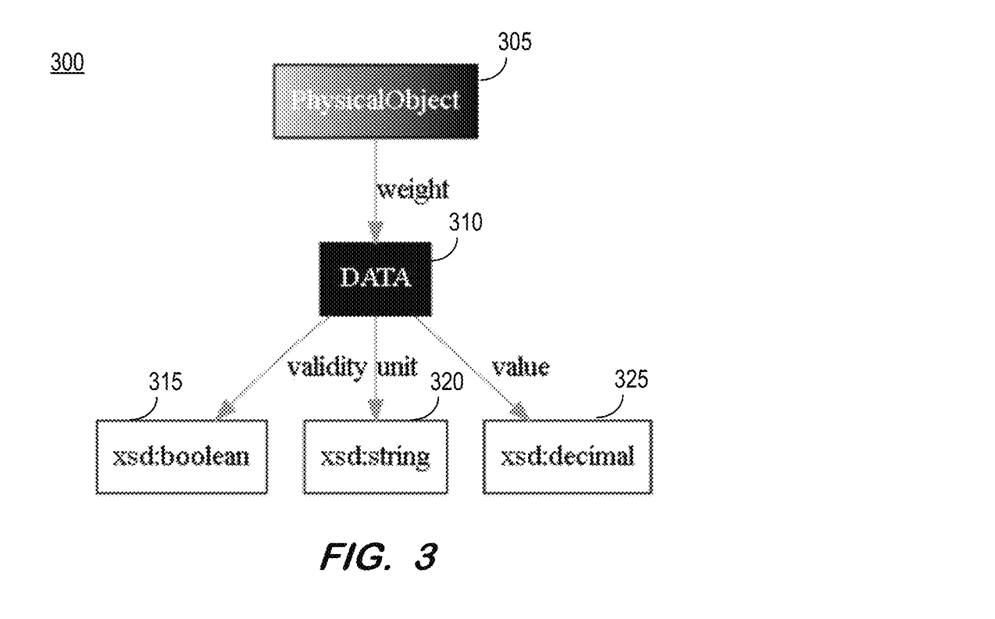
FIG. 3 is an illustrative depiction of one example of an illustrative graph model view of a semantic model, according to some aspects herein.

FIG. 3 is an illustrative graphic model view 300 of a semantic model, in accordance with some embodiments. The graphic model representation 300 is presented in an effort to further demonstrate some aspects of the implied properties disclosed herein. Referring to FIG. 300, the domain model therein is defined in terms of classes, properties, and property domain and range classes. For the example of FIG. 3, the following definitions apply (shown in SADL syntax):
DATA is a class,
described by value with a single value of type decimal,
described by validity with a single value of type boolean,
described by unit with a single value of type string.
PhysicalObject is a class,
described by weight with values of type DATA.

Accordingly, referring to graphical representation shown in FIG. 3, semantic model 300 includes the property weight having domain PhysicalObject (305) and range DATA (310). The properties value, validity, and unit each have domain DATA (310) and ranges xsd:Boolean (315), xsd:string (320), and xsd:decimal (325), respectively.

Figure 4:
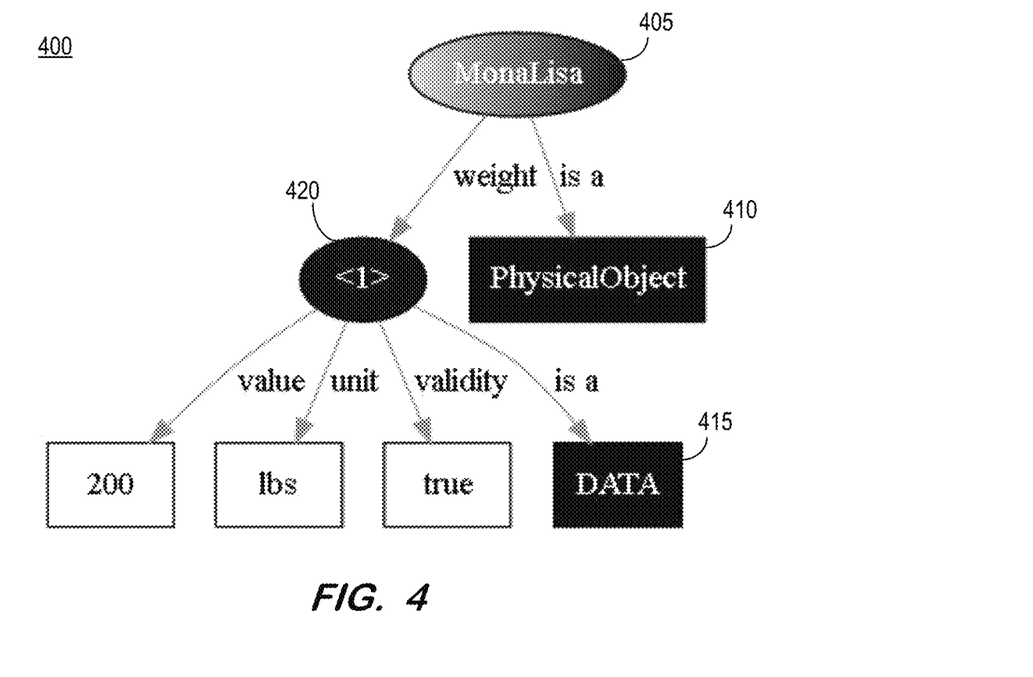
FIG. 4 is an illustrative example graph model view of the semantic model of FIG. 3 including instance data for the domain, according to some embodiments herein.

To further illustrate some aspects herein, FIG. 4 is an illustrative depiction of the semantic model 400 based on the model of FIG. 3 with some exemplary instance data for the domain. Namely, MonaLisa 405 is a PhysicalObject 410 with weight (a DATA 415 with ˆvalue 200, with unit "lbs", with validity true).

Referring to FIG. 4, the "<1>" in graph 400 signifies a blank node 420, given the identifier "<1>" to distinguish it from other blank nodes in the graph (no additional blank nodes shown in FIG. 4). In an example to query a triple store with respect to FIG. 4, one might ask,
weight of MonaLisa (in SPARQL, namespaces omitted, "select ?w where {<MonaLisa><weight>?w}")

This query will return the blank node designated "<1>" (420) in the graph. Using Jena (or other semantic model processing application or framework), the result is "w=–1f420ac5:15b49f44305:–5089(blank node)". However, this result is suited to sophisticated users, not typically understood by a naive user.

In an effort to generate statements and expressions in a more natural language-like format, implied properties in accordance with the present disclosure can be used to enhance the semantic model of FIG. 4. In particular, the following is added to the domain model.
DATA has impliedProperty value.
DATA has impliedProperty unit.
DATA has impliedProperty validity.

Having added the implied properties above to the semantic model 400, a reply to the query of weight of MonaLisa will now return an answer of "w→value=200, w→unit="lbs", w→validity=true".

Figure 5:
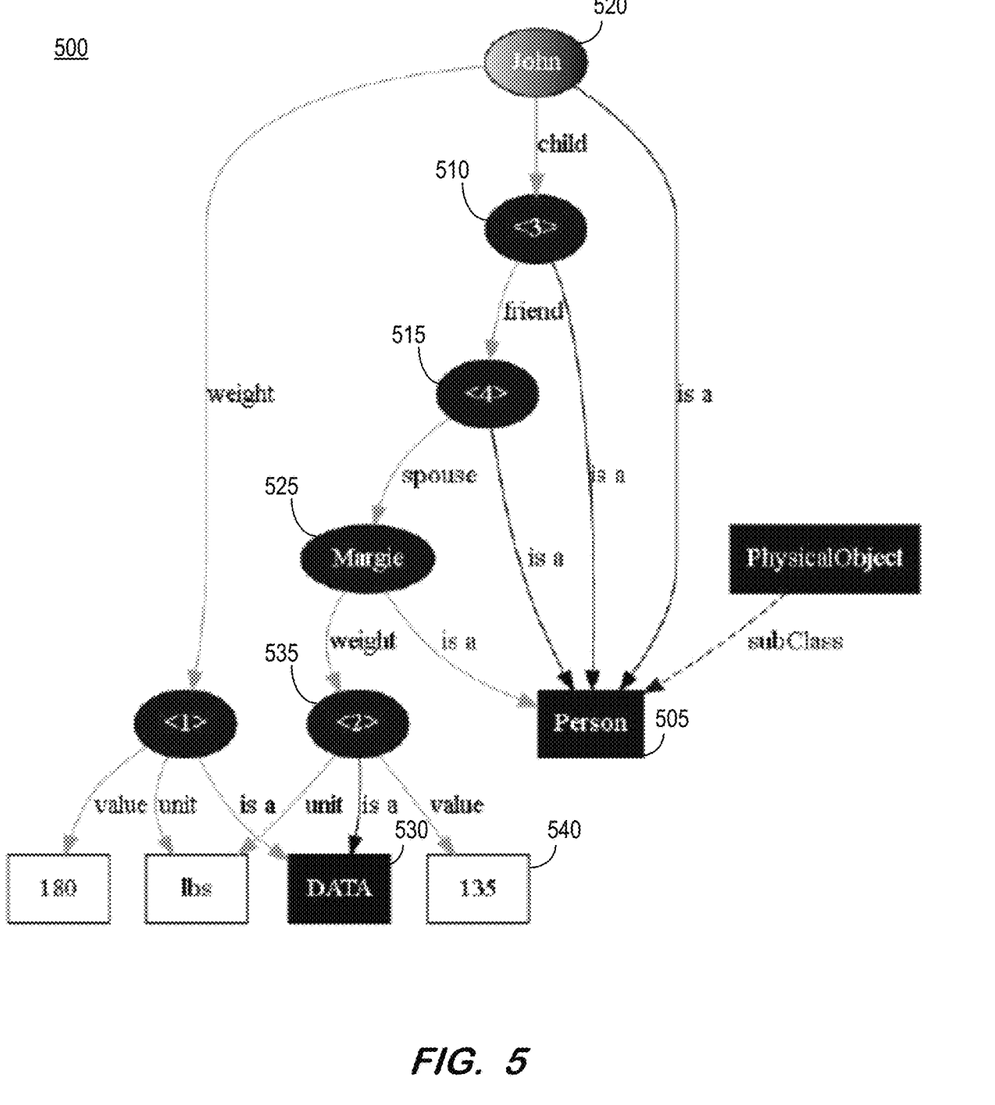
FIG. 5 is an illustrative depiction of a graph model view including property chains and implied properties, according to some embodiments herein.

In some aspects and use-cases, natural language statements and expressions might not be limited to a single triple statement (subject, predicate, object) per sentence. In some use-cases, a natural language sentence may include one or more chains of relationships. For example, consider the following snippet of OWL data (where the "validity" property is dropped for purposes of simplicity and clarity of the example).
Margie is a Person with weight (a DATA with value 135, with unit "lbs").
John is a Person with weight (a DATA with value 180, with unit "lbs").
John has child (a Person with friend (a Person with spouse Margie)).

This immediately foregoing data is visually depicted in the graph model 500 of FIG. 5. The graphical model 500 includes two unnamed instance nodes of type Person 505 (i.e., "<3>" at 510 and "<4>" at 515 in the property chain connecting John 520 and Margie 525.

Based on graph model 500, consider these two statements.
(1) Ask: select p where p has child with friend with spouse Margie
(2) Ask: select q where q is the spouse of a friend of a child of John.

The first query looks for a pattern with a "forward" property chain from an unbound variable "p" to the instance node "Margie". The second query however looks for a pattern with a "backward" property chain from an unbound variable "q" to the instance node "John". Given the example data set of FIG. 5, the first query will return a single possible binding for "p=John" and the second query will return the single possible binding for "q=Margie".

Now, still referring to FIG. 5, we consider the case where the second query above is modified slightly to:
Ask: select w where w is the weight of the spouse of a friend of a child of John and w<150.

In light of the modification, since the range of "weight" is "DATA" 530, and "DATA" cannot be compared ("<") to the number 150, an implied property may be considered to make sense of the query. As such, one implied property is found in "value". Therefore, the translated query is:
Ask: select wv where wv is the ˆvalue of the weight of the spouse of a friend of a child of John and wv<150.
Represented in SPARQL, the query is:
select ?wv where {<John><child>?x. ?x<friend>?y. ?y <spouse>?z. ?z <weight>?w . ?w<value>?wv. filter (?wv<150)}
where variable "x" corresponds to node "<3>" (510) in the graph, "y" corresponds to node "<4>"(515), "z" will be bound to "Margie"(525), "w" corresponds with node "<2>" (535), and "wv" will be bound to "135"(540).

In some aspects and embodiments, an applicability of implied properties may extend beyond operations with a property chain on one side and a value on the other, as the querying example above. For example, in a rule premise one might wish to compare two objects, such as "weight of X=weight of Y". (Other rule premise conditions would bind variables X and Y, e.g., a binding might be "weight of MonaLisa=weight of JohnDoe".) This comparison could return true only if all three of these statements were true.
value of weight of MonaLisa=value of weight of JohnDoe
unit of weight of MonaLisa=unit of weight of JohnDoe
validity of weight of MonaLisa=validity of weight of JohnDoe In some embodiments where the relationship is a comparison or an assignment, per the immediate example above, there can be multiple implied properties with a given range since the property chain is extended on each side of the relationship with the implied properties. For example, there could be implied properties on DATA of "value" with range decimal and "normalizedValue" with range decimal. Then, the result is the expansion of the comparison or assignment to include both:

value of weight of MonaLisa=value of weight of JohnDoe
nominalValue of weight of MonaLisa=nominalValue of weight of JohnDoe For comparison/assignments with implied properties to be applied on both sides of the relationship, a different annotation property could be used, the differentiation allowing multiple implied properties with the same range in this latter instance. For example, one might use as annotation property "expandedProperty".

As demonstrated by the foregoing examples, implied properties can be added to a modeling language to enhance the modeling capabilities and flexibility of the language, as well as being used in a variety of scenarios to produce more natural statements and expressions.

Figure 6:
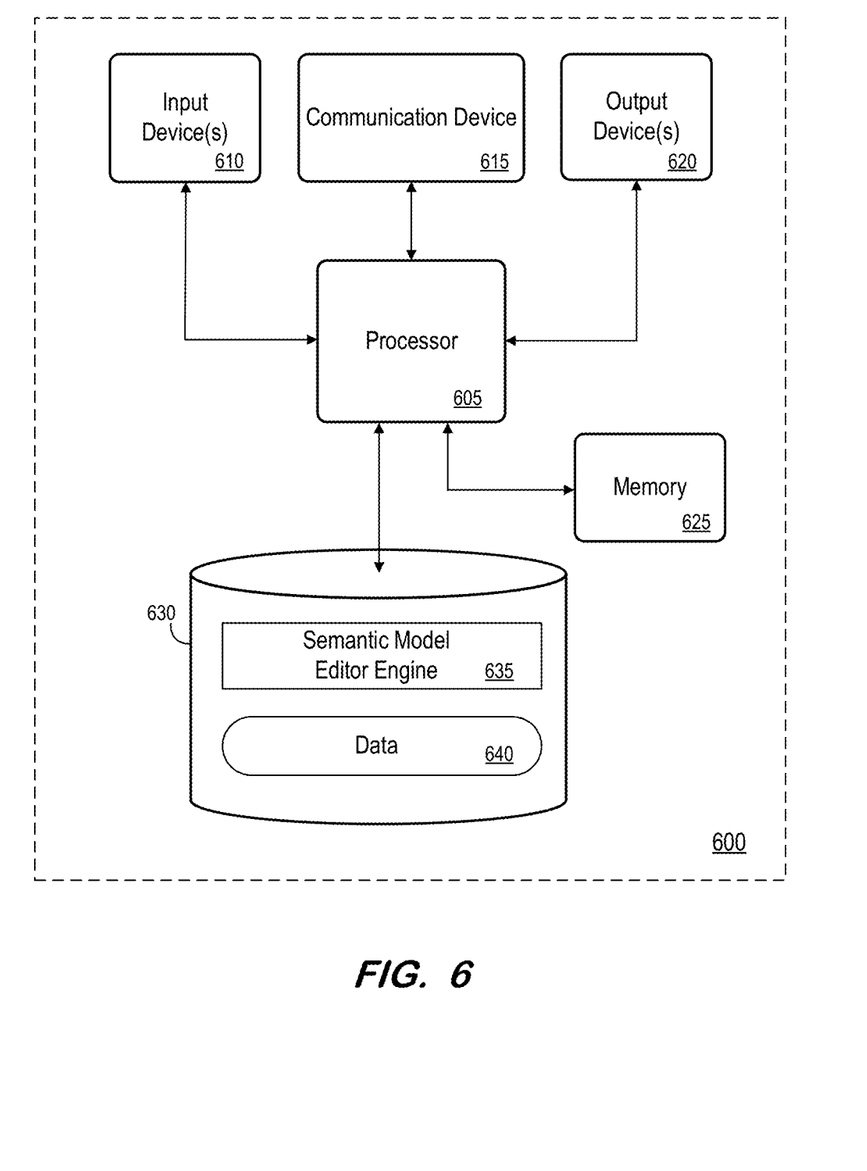
FIG. 6 is an illustrative depiction of a block diagram of a system or device that can support some processes disclosed herein.

Apparatus 600 includes processor 605 operatively coupled to communication device 615 to communicate with other systems, data storage device 630, one or more input devices 610 to receive inputs from other systems and entities, one or more output devices 620 and memory 625. Communication device 615 may facilitate communication with other systems and components, such as other devices, a communications network, and a server. Input device(s) 610 may comprise, for example, a keyboard, a keypad, a mouse or other pointing device, a microphone, knob or a switch, an infra-red (IR) port, a docking station, and/or a touch screen. Input device(s) 610 may be used, for example, to enter information into apparatus 600 such as an implied property specification and queries to make use of implied properties of a semantic model. Output device(s) 620 may comprise, for example, a display (e.g., a display screen) a speaker, and/or a printer.

Data storage device 630 may comprise any appropriate persistent storage device, including combinations of magnetic storage devices (e.g., magnetic tape, hard disk drives and flash memory), solid state storages device, optical storage devices, Read Only Memory (ROM) devices, Random Access Memory (RAM), Storage Class Memory (SCM) or any other fast-access memory. Data storage device 630 might store flight data plans, optimized controls command by some embodiments herein, etc.

Semantic model editor engine 635 and data 640 may comprise program instructions executed by processor 605 to cause apparatus 600 to perform any one or more of the processes described herein, including but not limited to aspects disclosed in FIG. 2. Embodiments are not limited to execution of these processes by a single apparatus.

Data 640 (either cached or a full database) may be stored in volatile memory such as memory 625. Data storage device 630 may also store data and other program code for providing additional functionality and/or which are necessary for operation of apparatus 600, such as device drivers, operating system files, etc. Data 640 may include performance data related software requirement translations that may be used in future software requirement translation tuning and/or optimization purposes.

Although specific features of various embodiments of the disclosure may be shown in some drawings and not in others, this is for convenience only. In accordance with the principles of the disclosure, any feature of a drawing may be referenced and/or claimed in combination with any feature of any other drawing.

This written description uses examples to disclose the embodiments, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed includes:

1. A method implemented by a processor, the method comprising:

accessing a semantic model, the semantic model having a grammar syntax supporting a comparison of at least one of a semantic model class and an instance of a semantic model class to an incompatible value;

defining, in a processor-executable semantic model editor in reply to a validator function of the semantic model yielding a type conflict when processing the comparison of at least one of a semantic model class and an instance of a semantic model class to an instance of the incompatible value, an implied property that is a property to associate with one of the semantic model class and the instance of a semantic model class in the semantic model, the implied property having an associated range;

adding the implied property to the semantic model;

generating, in a data storage device, a record of the semantic model including the implied property added thereto;

receiving, by a processor, a query including a request to compare at least one of the semantic model class and the instance of a semantic model class associated with the implied property to the instance of the incompatible value of the at least one semantic model class and the instance of the semantic model class included in the query;

referencing, by the processor during a validation and translation of the query, the implied property associated with the at least one of the semantic model class and the instance of the semantic model class included in the query, the processor being informed of the implied property associated with the at least one of the semantic model class and the instance of the semantic model class included in the query during the validation of the query by an annotation property of the at least one of the semantic model class and the instance of the semantic model class included in the query;

comparing, by the processor, the associated range of the implied property to the instance of the incompatible value; and generating, by the processor, a query result including a result of the comparison of the associated range of the implied property to the instance of the incompatible value.

2. The method of claim 1, wherein the natural language expression is expressed in English.

3. The method of claim 1, where the incompatible value is at least one of a number and a string value.

4. The method of claim 1, further comprising:

validating the expression to determine whether opposing sides of the comparison therein are of different types of entities;

translating the expression to determine whether the comparison in the expression can be processed in accordance with the grammar of the semantic model; and referencing, in an instance the validating and the translating determine opposing sides of the comparison are of different types of entities or the expression cannot be processed in accordance with the grammar of the semantic model, the implied property associated with one of the class and the instance of a class included in the expression to use the implied property in the validation and translation of the expression.

5. The method of claim 1, further comprising:
determining the range of the implied property is compatible with the incompatible value; and
evaluating the query, in response to the determination that the range of the implied property is compatible with the incompatible value, using the range of the implied property for the one of the class and the instance of a class included in the expression.

6. The method of claim 1, wherein the modeling language is a Semantic Application Design Language (SADL) Requirements Language (SRL).

7. The method of claim 6, wherein the SRL comprises a constrained SRL.

8. The method of claim 1, wherein the defining of an implied property includes associating an implied property indicator with the one of the semantic model class and the instance of a semantic model class having the implied property associated therewith, the implied property indicator being usable in the validation and translation of the query.

9. The method of claim 1, wherein the implied property is defined as an annotation property within the semantic model.

10. A system comprising:
a memory storing processor-executable instructions; and
a processor to execute the processor-executable instructions to cause the system to:
access a semantic model, the semantic model having a grammar syntax supporting a comparison of at least one of a semantic model class and an instance of a semantic model class to an incompatible value;
define, in a semantic model editor, in reply to a validator function of the semantic model yielding a type conflict when processing the comparison of at least one of a semantic model class and an instance of a semantic model class to an instance of the incompatible value, an implied property that is a property to associate with one of the semantic model class and the instance of a semantic model class in the semantic model, the implied property having an associated range;
add the implied property to the semantic model generate, in a data storage device, a record of the semantic model including the implied property added thereto;
receive a query including a request to compare at least one of the semantic model class and the instance of a semantic model class associated with the implied property to the instance of the incompatible value of the at least one semantic model class and the instance of the semantic model class included in the query;
reference, during a validation and translation of the query, the implied property associated with the at least one of the semantic model class and the instance of the semantic model class included in the query, the processor being informed of the implied property associated with the at least one of the semantic model class and the instance of the semantic model class included in the query during the validation of the query by an annotation property of the at least one of the semantic model class and the instance of the semantic model class included in the query;
compare the associated range of the implied property to the instance of the incompatible value; and
generate a query result including a result of the comparison of the associated range of the implied property to the instance of the incompatible value.

11. The system of claim 10, wherein the natural language expression is expressed in English.

12. The system of claim 10, where the incompatible value is at least one of a number and a string value.

13. The system of claim 10, further comprising:
validating, by the processor, the expression to determine whether opposing sides of the comparison therein are of different types of entities;
translating, by the processor, the expression to determine whether the comparison in the expression can be processed in accordance with the grammar of the semantic model; and
referencing, by the processor, in an instance the validating and the translating determine opposing sides of the comparison are of different types of entities or the expression cannot be processed in accordance with the grammar of the semantic model, the implied property specified for one of the class and the instance of a class included in the expression to use the implied property in the validation and translation of the expression.

14. The system of claim 10, further comprising:
determining, by the processor, the range of the implied property is compatible with the incompatible value; and
evaluating the query, by the processor, in response to the determination that the range of the implied property is compatible with the incompatible value, using the range of the implied property for the one of the class and the instance of a class included in the expression.

15. The system of claim 10, wherein the modeling language is a Semantic Application Design Language (SADL) Requirements Language (SRL).

16. The system of claim 15, wherein the SRL comprises a constrained SRL.

17. The system of claim 10, wherein the specifying of an implied property includes associating an implied property indicator with the one of the semantic model class and the instance of a semantic model class having the implied property specified therewith, the implied property indicator being usable in the validation and translation of the query.

18. The system of claim 10, wherein the implied property is defined as an annotation property within the semantic model.

* * * * *